US010602380B2

United States Patent
Ryu et al.

(10) Patent No.: US 10,602,380 B2
(45) Date of Patent: Mar. 24, 2020

(54) METHOD FOR SELECTING DATA TRANSMISSION MODE IN WIRELESS COMMUNICATION SYSTEM AND APPARATUS THEREFOR

(71) Applicant: LG ELECTRONICS INC., Seoul (KR)

(72) Inventors: Jinsook Ryu, Seoul (KR); Hyunsook Kim, Seoul (KR); Laeyoung Kim, Seoul (KR); Sangmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/774,929

(22) PCT Filed: Nov. 11, 2016

(86) PCT No.: PCT/KR2016/013016
§ 371 (c)(1),
(2) Date: May 9, 2018

(87) PCT Pub. No.: WO2017/082682
PCT Pub. Date: May 18, 2017

(65) Prior Publication Data
US 2018/0352448 A1 Dec. 6, 2018

Related U.S. Application Data

(60) Provisional application No. 62/253,689, filed on Nov. 11, 2015.

(51) Int. Cl.
*H04W 24/02* (2009.01)
*H04W 76/30* (2018.01)
(Continued)

(52) U.S. Cl.
CPC ............. *H04W 24/02* (2013.01); *H04W 8/04* (2013.01); *H04W 76/20* (2018.02); *H04W 76/30* (2018.02);
(Continued)

(58) Field of Classification Search
CPC ....... H04W 8/04; H04W 24/02; H04W 76/20; H04W 76/30
See application file for complete search history.

(56) References Cited

U.S. PATENT DOCUMENTS

2007/0275732 A1 11/2007 Jethwa et al.

FOREIGN PATENT DOCUMENTS

KR 1020150058187 5/2015
WO 2013176473 11/2013
(Continued)

OTHER PUBLICATIONS

PCT International Application No. PCT/KR2016/013016, International Search Report dated Feb. 24, 2017, 10 pages.

*Primary Examiner* — Kevin C. Harper
(74) *Attorney, Agent, or Firm* — Lee Hong Degermam Kang Waimey

(57) ABSTRACT

A method for indicating a data transmission mode in a connection procedure in a wireless communication system, may comprise the steps of: receiving a connection request message from a terminal; transmitting an update location request message to an HSS; receiving an update location response message including the subscription information of the terminal as a response to the update location request message; the MME determining an application of a CP mode as the data transmission mode for a PDN connection on the basis of a local policy, wherein the data transmission mode includes a UP mode and the CP mode; and transmitting, to a terminal, a connection grant message including informa-
(Continued)

tion that indicates an application of the CP mode as a response to the connection request message.

12 Claims, 15 Drawing Sheets

(51) Int. Cl.
  *H04W 76/20* (2018.01)
  *H04W 8/04* (2009.01)
  *H04W 60/04* (2009.01)
  *H04W 28/02* (2009.01)
  *H04W 8/24* (2009.01)

(52) U.S. Cl.
  CPC .......... *H04W 8/24* (2013.01); *H04W 28/0226* (2013.01); *H04W 60/04* (2013.01)

(56) References Cited

FOREIGN PATENT DOCUMENTS

| | | |
|---|---|---|
| WO | 2014098393 | 6/2014 |
| WO | 2014129849 | 8/2014 |

【FIG. 1】
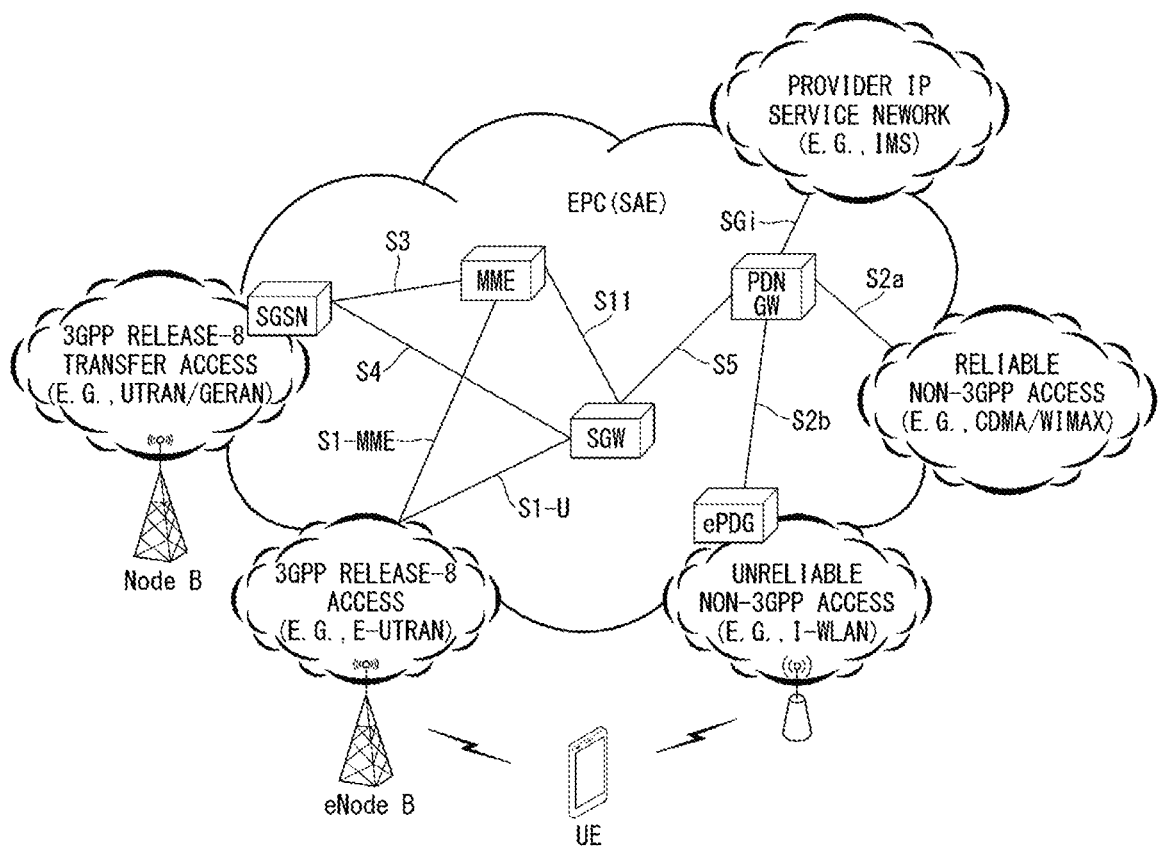

[FIG. 2]
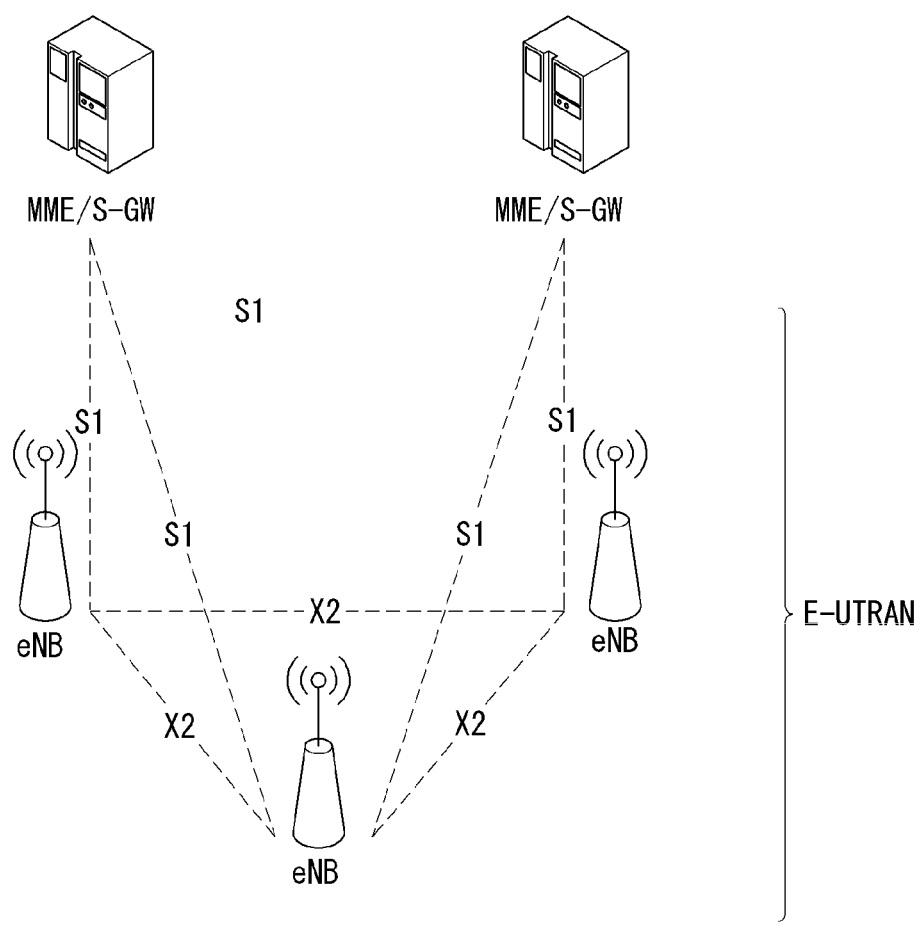

[FIG. 3]
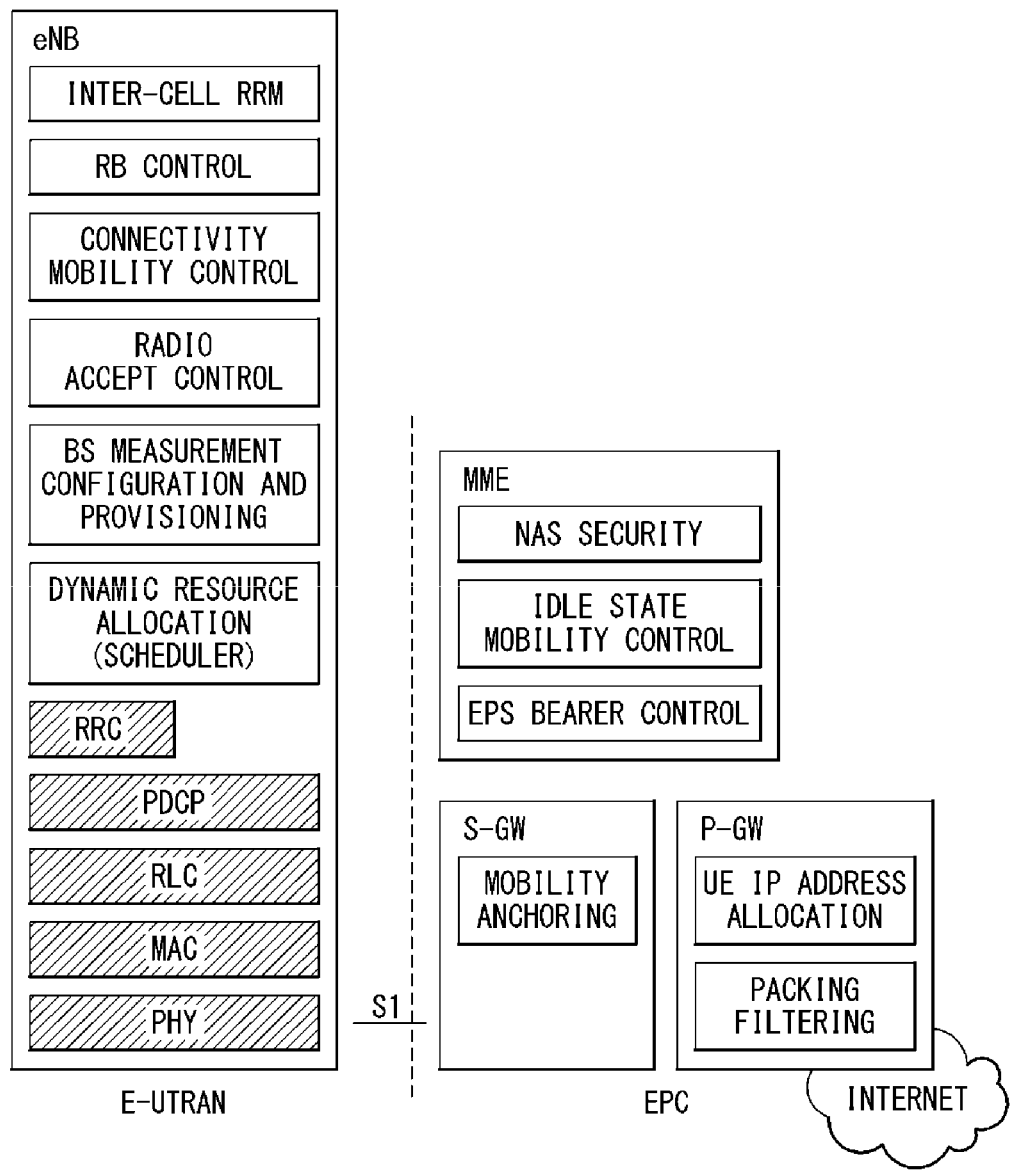

[FIG. 4]
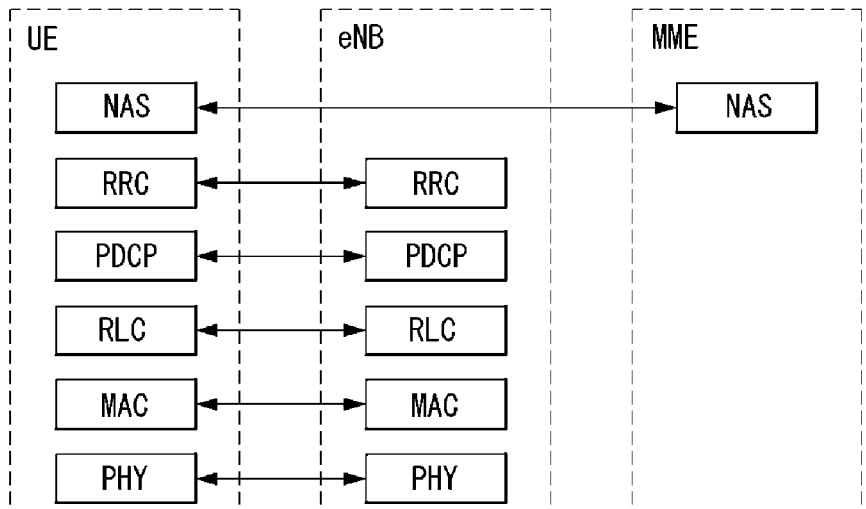
(a) CONTROL PLANE PROTOCOL STACK
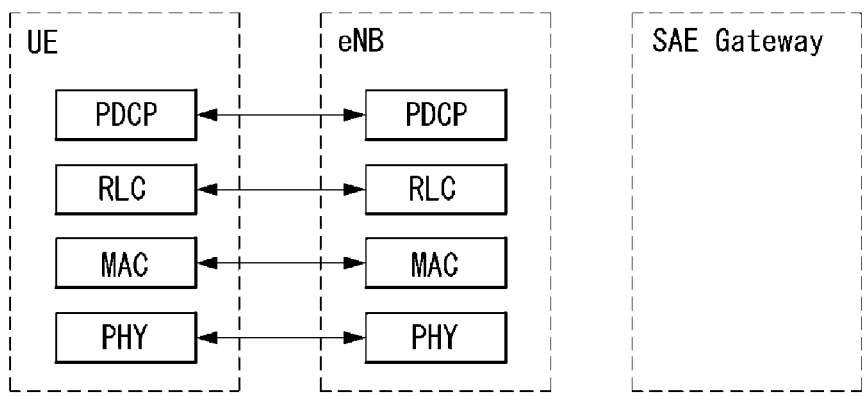
(b) USER PLANE PROTOCOL STACK
[FIG. 5]
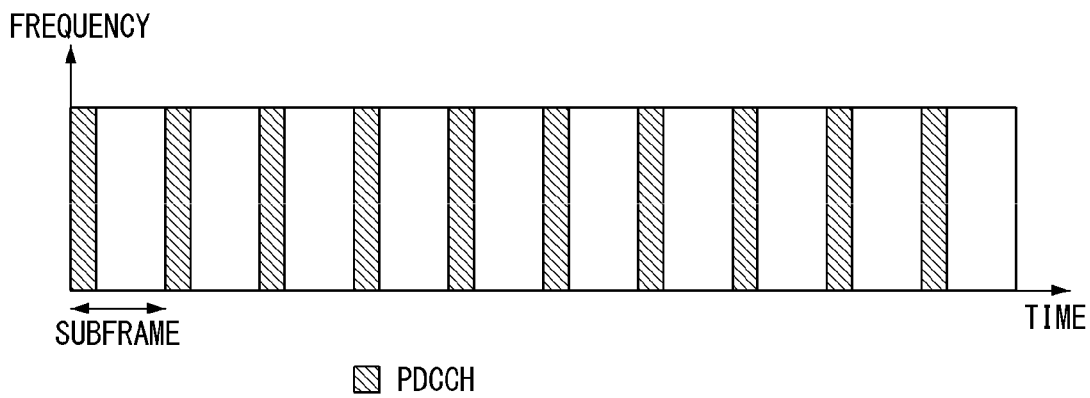

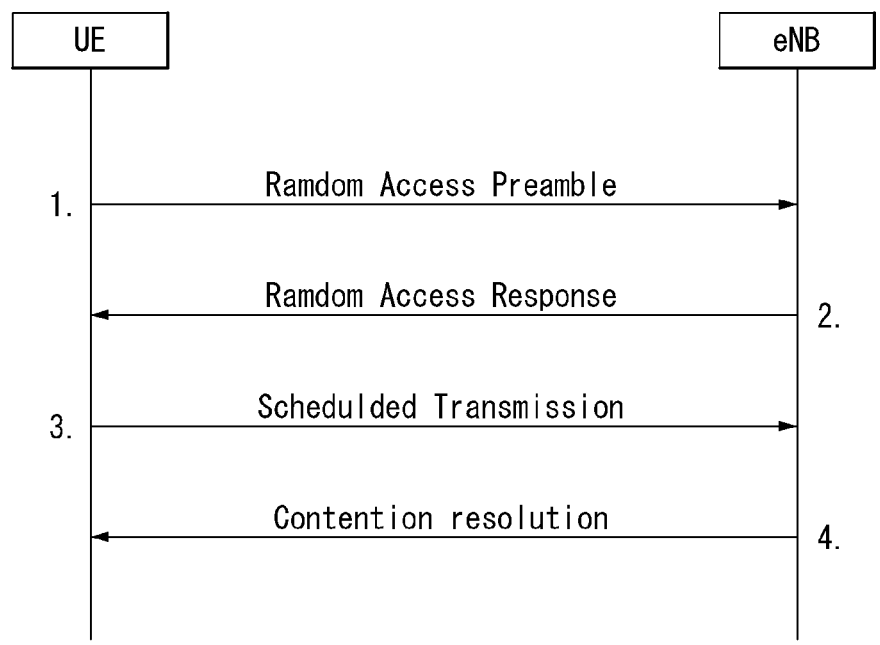
[FIG. 6]

[FIG. 7]
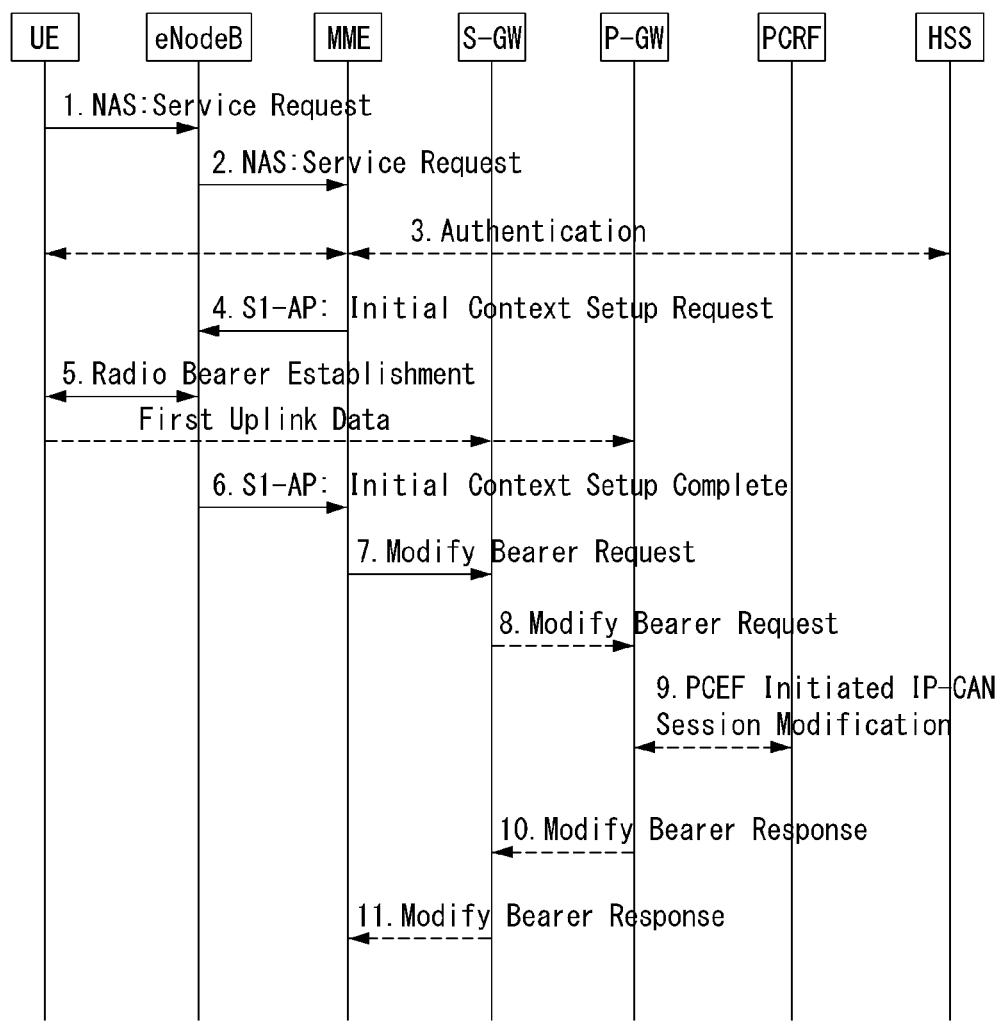

[FIG. 8]
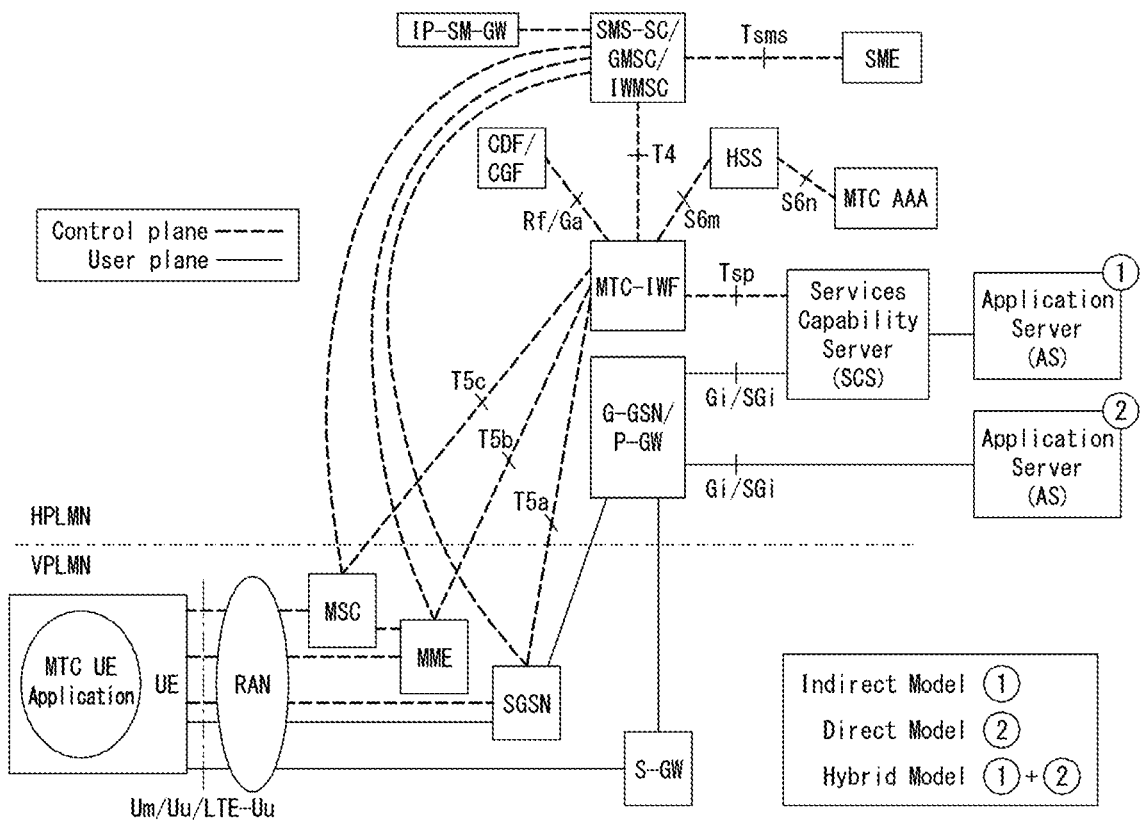

[FIG. 9]
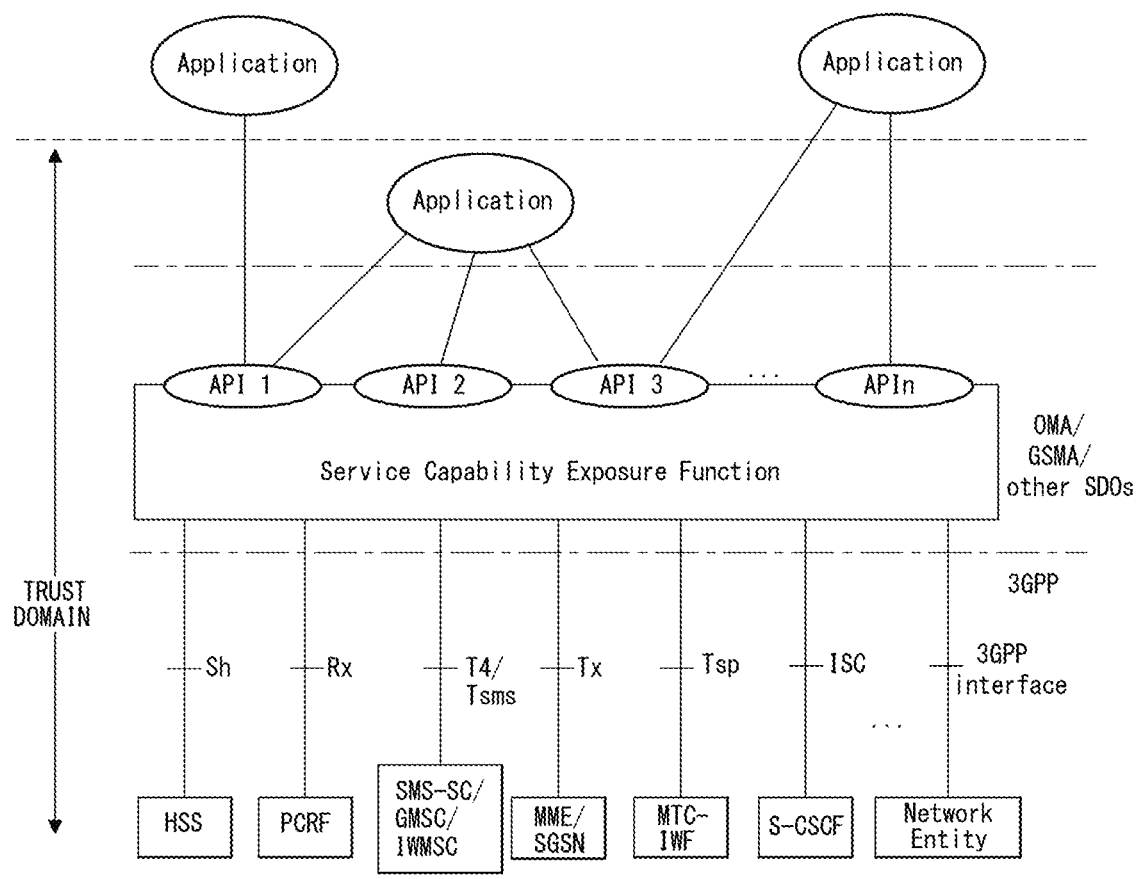

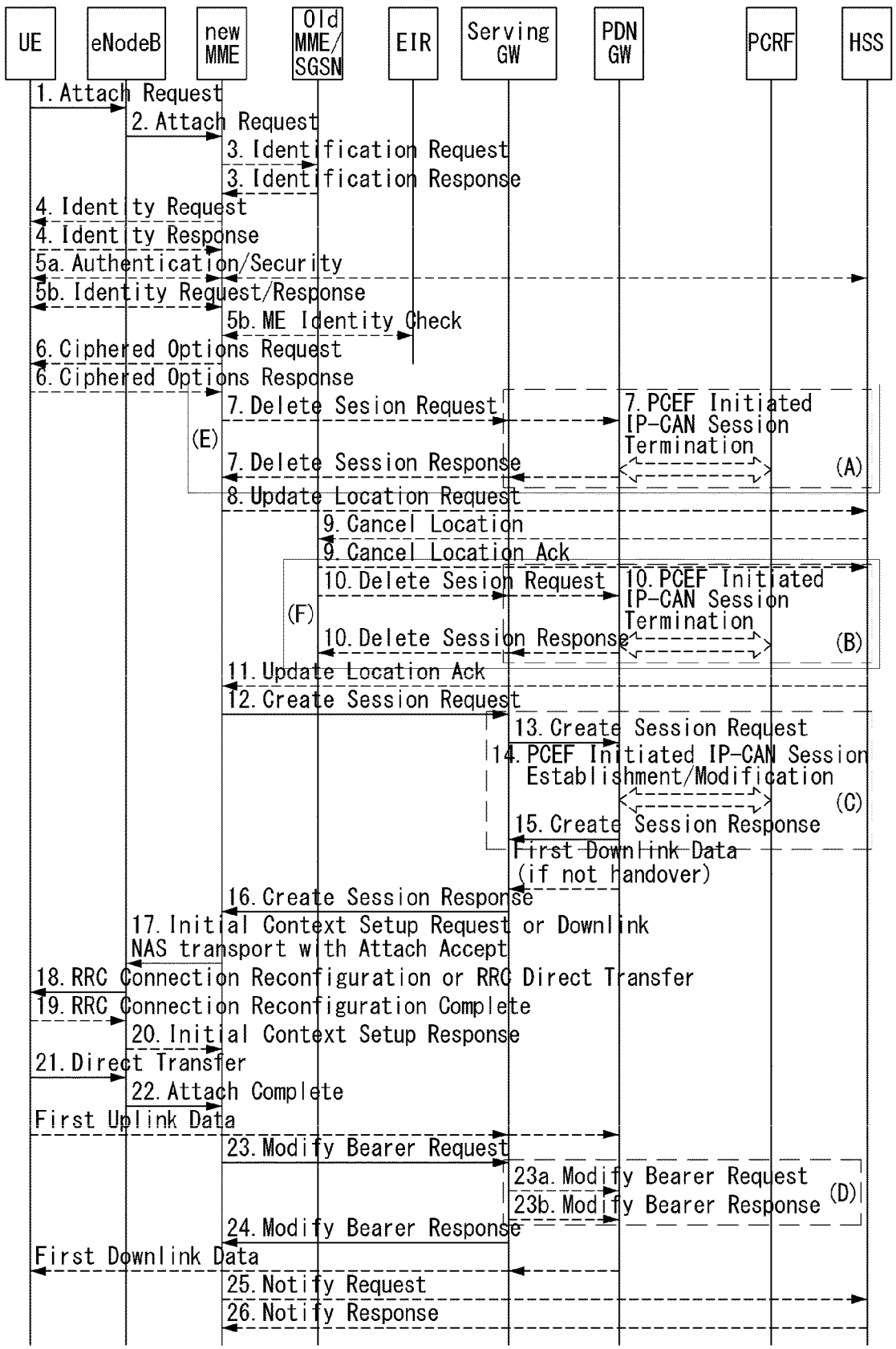
[FIG. 10]

[FIG. 11]
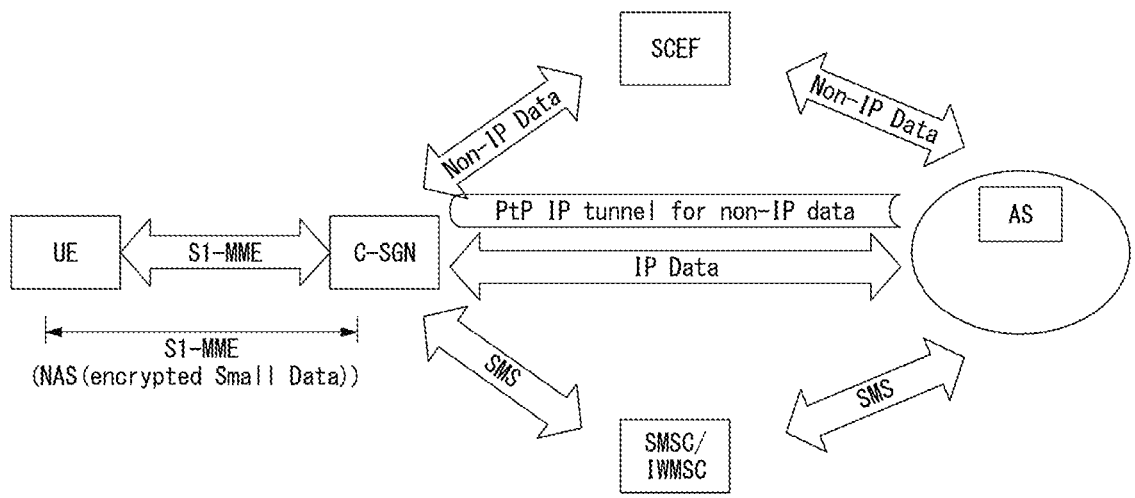
[FIG. 12]
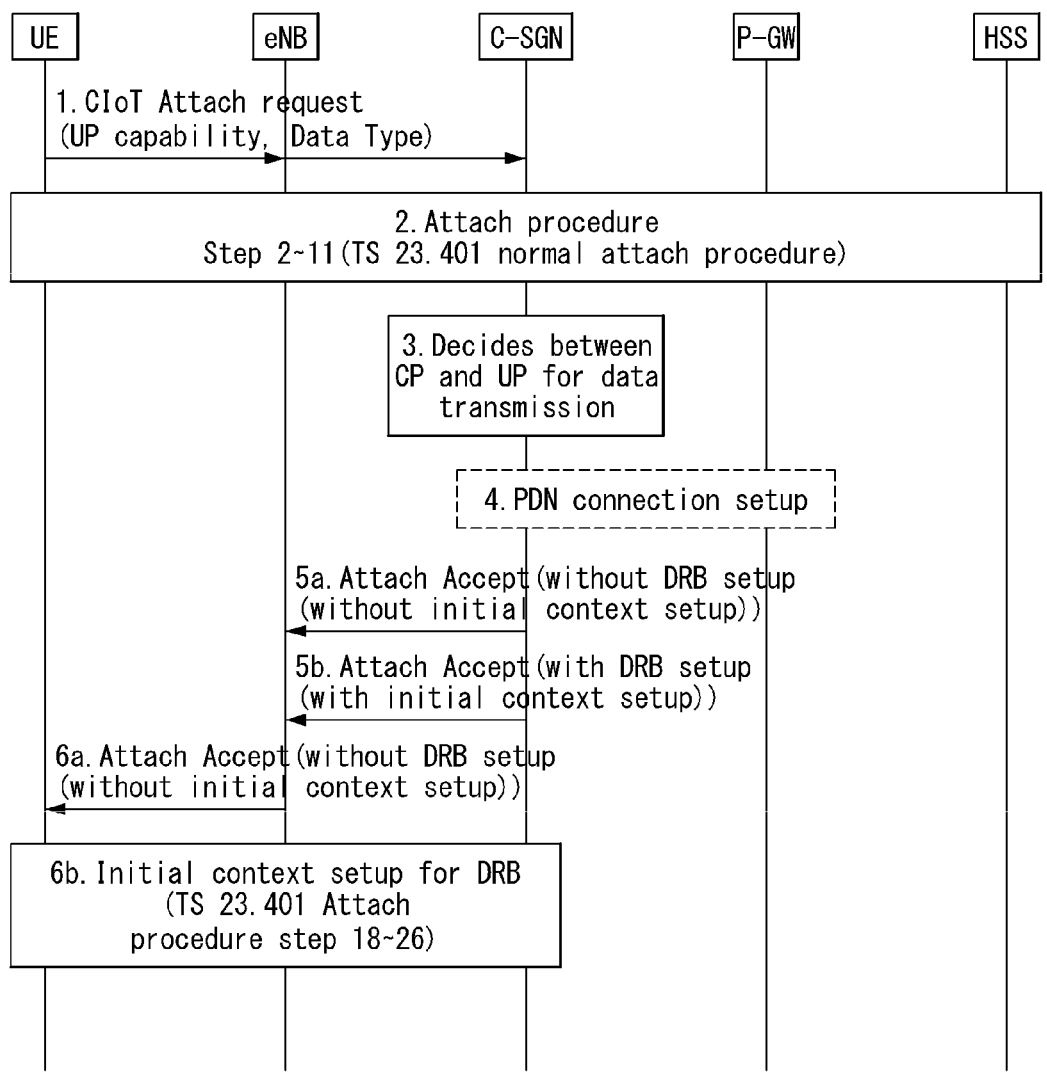

[FIG. 13]
(a) Control Plane data path
& User Plane data path
For C-SGN
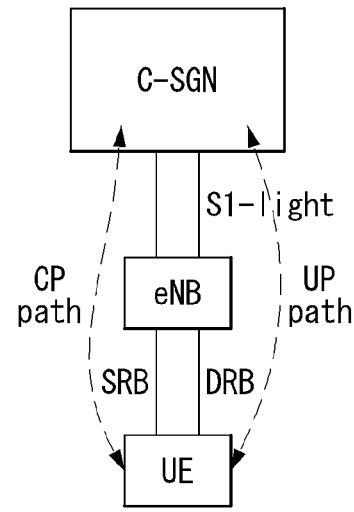
(b) Control Plane data path
& User Plane data path
For legacy EPS
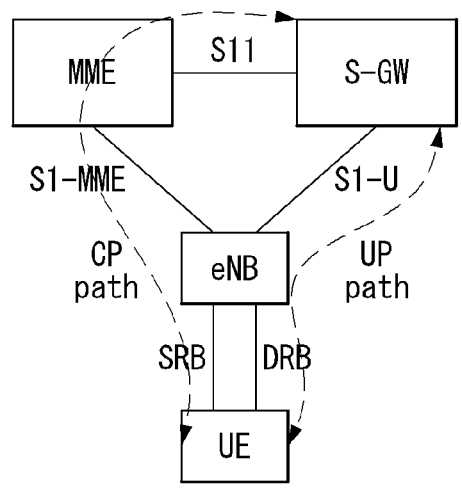

[FIG. 14]
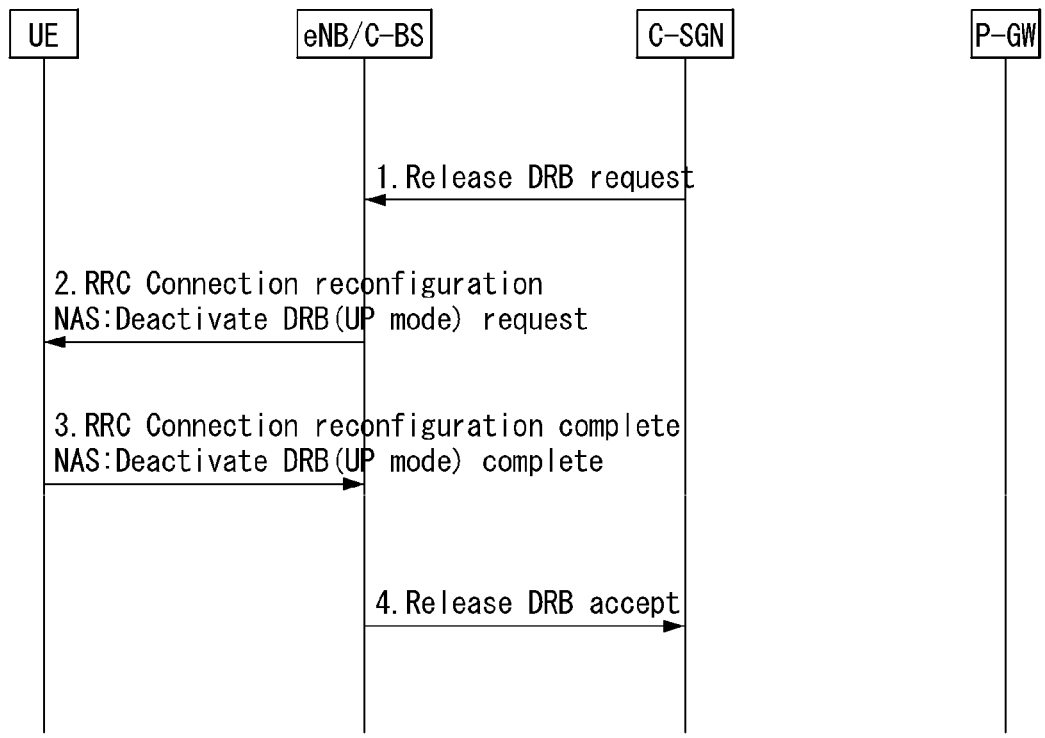
[FIG. 15]
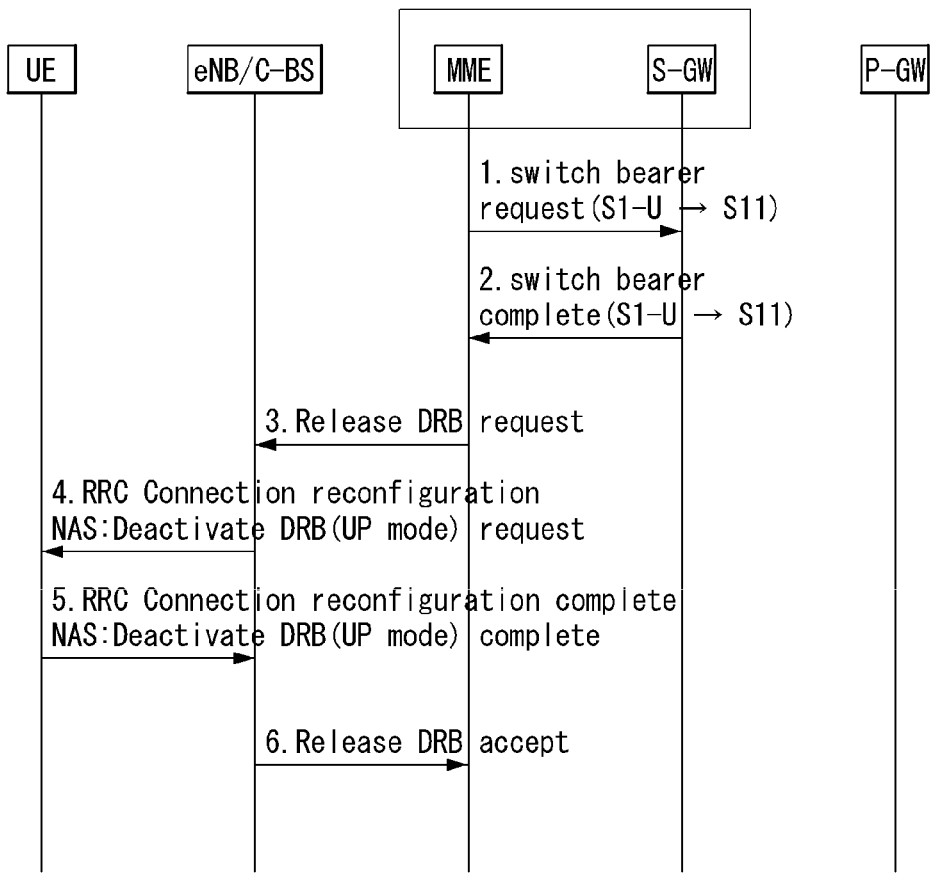

[FIG. 16]
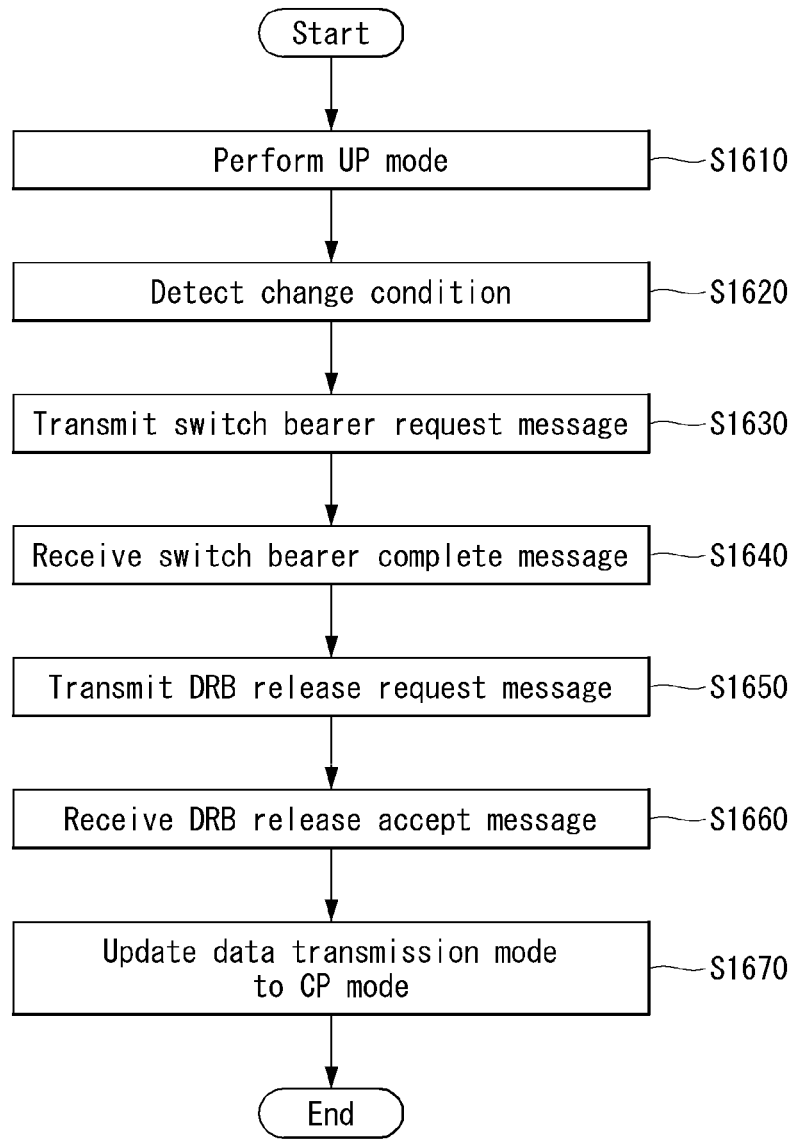

[FIG. 17]
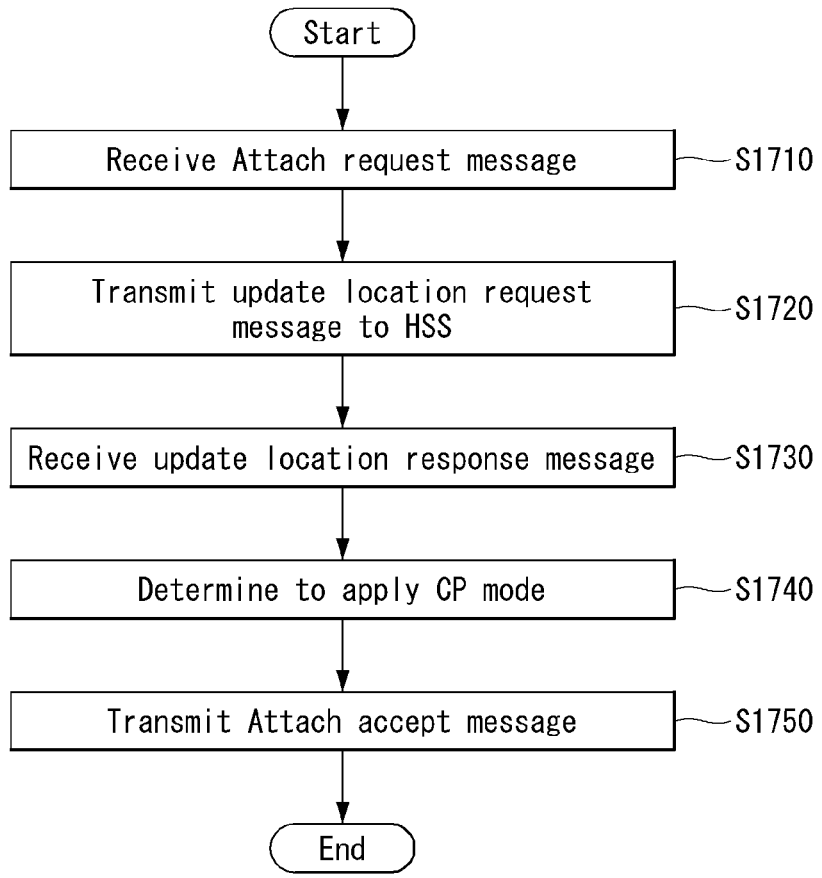
[FIG. 18]
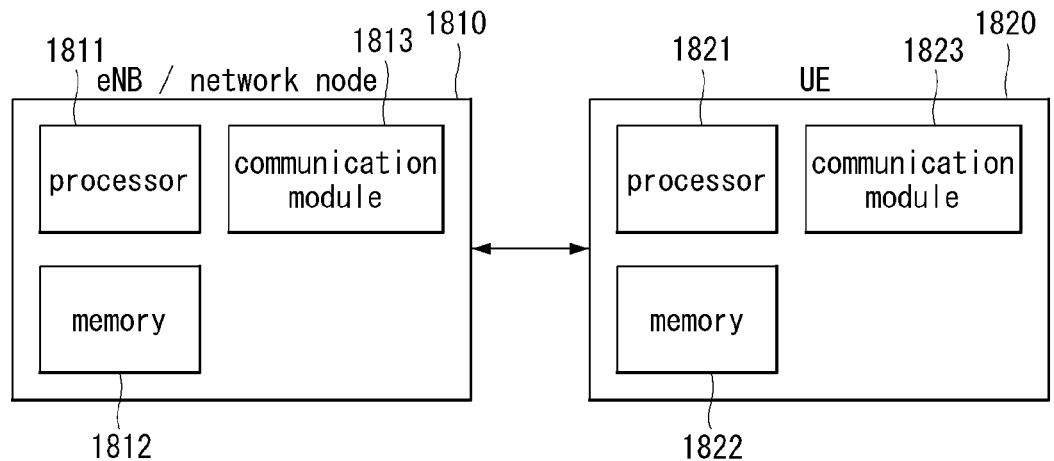

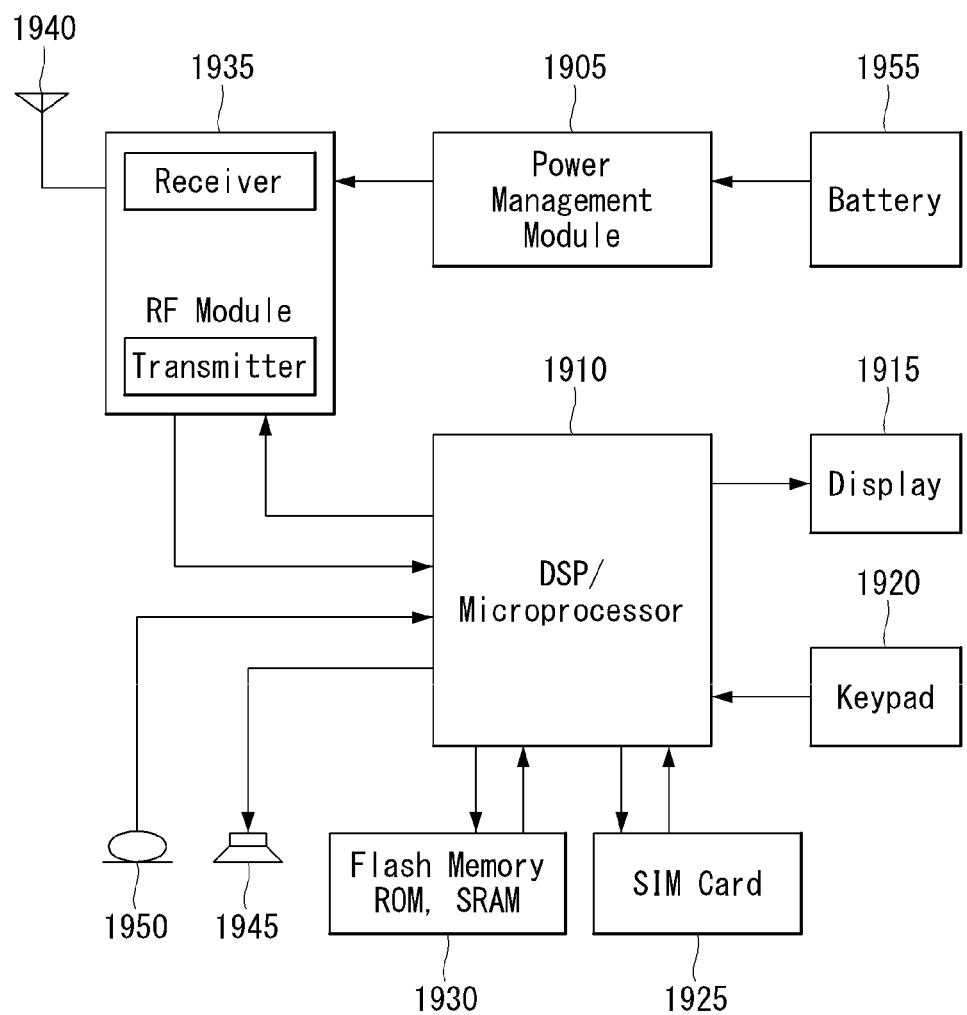
[FIG. 19]

METHOD FOR SELECTING DATA TRANSMISSION MODE IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/013016, filed on Nov. 11, 2016, which claims the benefit of U.S. Provisional Application No. 62/253,689, filed on Nov. 11, 2015, the contents of which are all hereby incorporated by reference herein in their entirety.

TECHNICAL FIELD

The present invention relates to a method for selecting a data transmission mode in a wireless communication system, and more particularly, to a method for selecting either one of a data transmission mode in a user plane or a data transmission mode in a control plane and an apparatus for the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a method for selecting a data transmission mode properly for efficient data transmission in a wireless communication system.

In addition, an object of the present invention is to propose a method for switching a data transmission mode to another data transmission mode efficiently in a wireless communication system.

The technical objects to attain in the present disclosure are not limited to the above-described technical objects and other technical objects which are not described herein will become apparent to those skilled in the art from the following description.

Technical Solution

As an embodiment of the present invention, a method for switching a data transmission mode performed by a Mobility Management Entity (MME) in a wireless communication system may include performing a User Plane (UP) mode, which is a data transmission mode of transmitting and receiving data, through a Data Radio Bearer (DRB), between a user equipment (UE) and a base station (BS) in a user plane; detecting a change condition from the UP mode to a Control Plane (CP) mode, which is a data transmission mode of transmitting and receiving data, through a Signaling Radio Bearer (SRB), between the UE and the BS in a control plane, where the change condition is configured based on a radio resource control (RRC) connection setup request frequency of the UE, whether to change subscription information of the UE, whether to change a traffic pattern of the UE and/or whether to receive communication pattern information of the UE; transmitting a switch bearer request message for changing a bearer to a Serving-Gateway (S-GW); receiving a switch bearer complete message from the S-GW in response to the switch bearer request message; transmitting a DRB release request message to the UE through the BS, where the DRB release request message includes a Non-Access Stratum (NAS) message indicating a release of the DRB or the data change mode switching from the UP mode to the CP mode; receiving a DRB release accept message in response to the DRB release request message; and updating the data transmission mode to the CP mode according to the DRB release accept message.

In addition, when the BS receives the DRB release request message, the BS may delete Access Stratum parameters associated with the UE, and may forward the received NAS message to the UE.

In addition, when the UE receives the NAS message, the UE may switch the UP mode to the CP mode.

In addition, the method for switching a data transmission mode may further include receiving a service request message for initiating a UE service request procedure from the UE switched to the CP mode, and the service request message for the CP mode may be defined as a different message format from the service request message for the UP mode.

In addition, the method for switching a data transmission mode may further include receiving the data through a NAS packet data unit (PDU) from the UE switched to the CP mode, when the UE-triggered service request procedure is completed.

In addition, when the data transmission mode is switched from the UP mode to the CP mode, a path through which data is transmitted from the UE may be changed from the user plane path via the BS and the S-GW to the control plane path via the BS, the MME and the S-GW.

In addition, according to another embodiment of the present invention, a method for indicating a data transmission mode performed by a Mobility Management Entity (MME) in a wireless communication system may include receiving an Attach request message from a user equipment (UE), where the Attach request message includes capability information of a data transmission mode supportable by the UE, where the data transmission mode includes a User Plane (UP) mode and the Control Plane (CP) mode, wherein the UP mode is a data transmission mode of transmitting and receiving data in a user plane through a Data Radio Bearer (DRB) between the UE and the BS, where the CP mode is a data transmission mode in which a Non-Access Stratum (NAS) packet data unit (PDU) carrying data is generated, and the generated NAS PDU is included in a radio resource control (RRC) container and transmitted and received between the UE and the BS;

transmitting an Update location request message to a Home Subscriber Server (HSS); receiving an Update location ack message including subscription information of the UE in response to the Update location request message; determining an application of the CP mode as the data transmission mode for a Packet Data Network (PDN) connection based on a local policy by the MME; and transmitting an Attach accept message including information of indicating to apply the CP mode in response to the Attach request message to UE.

In addition, the method for switching a data transmission mode may further include receiving a service request message for initiating a UE-triggered service request procedure from the UE to which the CP mode is applied based on the Attach accept message, and the service request message for the CP mode may be defined as a different message format from the service request message for the UP mode.

In addition, when the Attach request message includes PDN type information indicating non-ip type and the PDN connection is established through Service Capability Exposure Function (SCEF), the MME may be always configured to include information indicating to apply the CP mode in the Attach accept message, and to transmit the information.

In addition, when the CP mode is applied, the MME may be configured not to perform an initial context setup procedure.

Technical Effects

According to an embodiment of the present invention, proper selection and switch of a data transmission mode is available according to a situation, and there is an advantage that data transmission/reception between a terminal and a base station is available more efficiently.

In addition, according to an embodiment the present invention, when frequent RRC connection setup is generated owing to a movement of a terminal, User Plane (UP) mode is changed to Control Plane (CP) mode, and there is an effect of preventing overhead owing to the frequent RRC connection setup generation.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 1 is a diagram schematically exemplifying an evolved packet system (EPS) to which the present invention can be applied.

FIG. 2 illustrates an example of evolved universal terrestrial radio access network structure to which the present invention can be applied.

FIG. 3 exemplifies a structure of E-UTRAN and EPC in a wireless communication system to which the present invention can be applied.

FIG. 4 illustrates the structure of a radio interface protocol between a UE and E-UTRAN in a wireless communication system to which the present invention can be applied.

FIG. 5 is a diagram schematically showing the structure of a physical channel in a wireless communication system to which the present invention may be applied.

FIG. 6 is a diagram for describing a contention based random access procedure in a wireless communication system to which the present invention may be applied.

FIG. 7 is a diagram illustrating a UE-triggered Service Request procedure in a wireless communication system to which the present invention may be applied.

FIG. 8 is a diagram exemplifying a machine-type communication (MTC) architecture in a wireless communication system to which the present invention can be applied.

FIG. 9 exemplifies an architecture for service capability exposure in a wireless communication system to which the present invention can be applied.

FIG. 10 is a flowchart illustrating an attach procedure according to an embodiment of the present invention.

FIG. 11 is a diagram illustrating an End to End small data flow in a wireless communication system to which the present invention may be applied.

FIG. 12 is a flowchart illustrating an attach procedure for a CIoT UE according to an embodiment of the present invention.

FIGS. 13 to 15 are diagrams illustrating a method for switching from the UP mode to the CP mode according to an embodiment of the present invention.

FIG. 16 is a flowchart for a data transmission mode switching method by an MME according to an embodiment of the present invention.

FIG. 17 is a flowchart of a method for indicating a data transmission mode of an MME according to an embodiment of the present invention.

FIG. 18 illustrates a block diagram of a communication device according to one embodiment of the present invention.

FIG. 19 illustrates a block diagram of a wireless communication apparatus according to an embodiment of the present invention.

BEST MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network (For example, communicating with an MTC server via a PLMN) and performing an MTC function MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC User (MTC User): The MTC user uses the service provided by the MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): An entity within the 3GPP architecture for service capability exposure that provides a means for securely exposing services and capabilities provided by 3GPP network interfaces.

In what follows, the present invention will be described based on the terms defined above.

Overview of System to which the Present Invention May be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 exemplifies a structure of E-UTRAN and EPC in a wireless communication system to which the present invention can be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 is a diagram schematically exemplifying a structure of physical channel in a wireless communication system to which the present invention can be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

FIG. 6 is a diagram for describing the contention-based random access procedure in the wireless communication system to which the present invention can be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, S-TMSI or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

FIG. 7 is a diagram illustrating a UE-triggered Service Request procedure in a wireless communication system to which the present invention may be applied.

1-2. A UE starts a UE-triggered Service Request procedure by transmitting a Service Request message to an MME.

The Service Request message is forwarded by being included in an RRC Connection Setup Complete message in an RRC connection, and forwarded by being included in an Initial UE message in an S1 signaling connection.

3. The MME requests and receives information for authentication to an HSS for UE authentication, and performs mutual authentication with the UE.

4. The MME transmits an Initial Context Setup Request message to an eNB such that the eNB configures S1 bearer with an S-GW and configures a DRB with the UE.

5. The eNB transmits an RRC Connection Reconfiguration message to the UE in order to generate a DRB.

When this procedure is ended, a DRB generation between the eNB and the UE is completed and all of uplink EPS bearers are configured throughout the UE to a P-GW.

6. The eNB transmits an Initial Context Setup Complete message including 'S1 eNB TEID' to the MME in response to the Initial Context Setup Request message.

7. The MME forwards the 'S1 eNB TEID' received from the eNB to the S-GW through a Modify Bearer Request message.

When this procedure is ended, the generation of downlink S1 bearer between the eNB and the S-GW is completed and all of downlink EPS bearers are configured throughout the P-GW to the UE. The UE may receive downlink traffic from the P-GW.

8. In the case that a cell (E-UTRAN Cell Global Identifier; ECGI) or a tracking area (TAI) in which the UE is located is changed, the S-GW transmits the Modify Bearer Request message and notifies it to the P-GW.

9. If it is required, the P-GW may perform an IP connectivity access network (IP-CAN) session modification procedure with a PCRF.

10. When the P-GW receives the Modify Bearer Request message from the S-GW, the P-GW transmits a Modify Bearer Response message to the S-GW in response to it.

11. The S-GW transmits the Modify Bearer Response message to the MME in response to the Modify Bearer Request message.

Generally, a Network-triggered Service Request procedure is performed when a network is intended to transmit downlink data to the UE in an ECM-IDLE state.

When the procedure illustrated in FIGS. 6 and 7 is completed, the UE is available to transmit/receive UL/DL data with the S-GW through the established RRC connection.

Next, in the case that a release condition of the RRC connection is satisfied (e.g., in the case that a particular timer expires or a specific time passes), the eNB may transmit an S1-AP UE Context Release Request (S1-AP UE Ctxt Release Req) message for releasing an RRC connection to the MME. And then, the MME may transmit a Release Access Bearers Request message (Release Access Bearers Req) for releasing an access bearer connection to the S-GW, and in response to it, may receives a Release Access Bearer Response message (Release Access Bearers Resp) from the S-GW. Next, the MME may transmit an S1-AP UE Context Release Command message to the eNB. As a result, the RRC connection between the eNB and the UE may be released. Lastly, the eNB may transmit an S1-AP UE Context Release Complete message notifying that the RRC connection release is completed to the MME.

Machine-Type Communication (MTC)

FIG. 8 is a diagram exemplifying a machine-type communication (MTC) architecture in a wireless communication system to which the present invention can be applied.

An end-to-end application between the UE (or MTC UE) used for the MTC and an MTC application may adopt services provided in the 3GPP system and the optional services provided to an MTC server. The 3GPP system may provide transport and communication services (including 3GPP bearer services, IMS, and SMS) including various optimizations to facilitate the MTC.

FIG. 8 illustrates that the UE used for the MTC is connected to a 3GPP network (UTRAN, E-UTRAN, GERAN, I-WLAN, etc.) through an Um/Uu/LTE-Uu interface. The architecture of FIG. 8 includes various MTC models (Direct, Indirect, and Hybrid models).

First, entities illustrated in FIG. 8 will be described.

In FIG. 8, the application server is a server on the network where the MTC application is executed. Techniques for implementing various MTC applications described above may be applied to the MTC application server and a detailed description thereof will be omitted. Further, in FIG. 7, the MTC application server may access the MTC server through a reference point API, and a detailed description thereof will be omitted. Alternatively, the MTC application server may be collocated with the MTC server.

The MTC server (e.g., an SCS server in FIG. 7) is a server on the network that manages the MTC terminal and may communicate with the UE and PLMN nodes connected to the 3GPP network and used for the MTC.

An MTC-interworking function (MTC-IWF) may manage interworking between the MTC server and an operator core network and act as a proxy for the MTC operation. In order to support an MTC indirect or hybrid model, the MTC-IWF may relay or interpret a signaling protocol on a reference point Tsp to enable a specific function in the PLMN. The MTC-IWF performs a function of authenticating the MTC server before the MTC server establishes communication with the 3GPP network, a function of authenticating a control plane request from the MTC server, various functions related to a trigger instruction described later, etc.

Short Message Service-Service Center (SMS-SC)/Internet Protocol Short Message GateWay (IP-SM-GW) may manage transmission and reception of the short message service (SMS). The SMS-SC may be responsible for relaying, storing, and delivering short messages between a short message entity (SME) (an entity transmitting or receiving short messages) and the UE. The IP-SM-GW may take charge of protocol interoperability between a IP-based UE and the SMS-SC.

Charging data function (CDF)/charging gateway function (CGF) may perform charging-related operations.

The HLR/HSS may serve to store subscriber information (IMSI, etc.), routing information, configuration information, etc., and provide the subscriber information (IMSI, etc.), routing information, configuration information, etc., to the MTC-IWF.

The MSC/SGSN/MME may perform control functions including mobility management, authentication, resource allocation, etc., for network connection of the UE. The MSC/SGSN/MME may perform a function of receiving the trigger instruction from the MTC-IWF and processing the received trigger instruction in the form of the message to be provided to the MTC UE in association with the triggering described later.

The gateway GPRS support node (GGSN)/serving-gateway (S-GW)+packet date network-gateway (P-GW) may perform a gateway function of taking charge of connection between a core network and an external network.

In Table 2, main reference points in FIG. 8 are summarized.

TABLE 2

| Reference point | Description |
| --- | --- |
| Tsms | Reference point used for an entity outside the 3GPP system to communicate with the MTC UE via the SMS |
| Tsp | Reference point used for the entity outside the 3GPP system to communicate with the MTC-IWF in association with control plane signaling |
| T4 | Reference point used by the MTC-IWF to route device triggers to the SMS-SC of the HPLMN |
| T5a | Reference point between the MTC-IWF and a serving SGSN |
| T5b | Reference point between the MTC-IWF and a serving MME |
| T5c | Reference point between the MTC-IWF and a serving MSC |
| S6m | Reference point used by the MTC-IWF to inquire identification information (E.164 Mobile Station International Subscriber Directory Number (MSISDN) or IMSI mapped to an external identifier) of the UE and to collect UE accessibility and configuration information |

In Table 2, at least one of the reference points T5a, T5b, and T5c is referred to as T5.

Meanwhile, user plane communication with the MTC server in the case of the indirect and hybrid models and communication with the MTC application server in the case of the direct and hybrid models may be performed using the existing protocol through the reference points Gi and SGi.

Specific details related to the contents described in FIG. 8 may be incorporated into the present document by reference of 3GPP TS 23.682 document.

FIG. 9 exemplifies an architecture for service capability exposure in a wireless communication system to which the present invention can be applied.

The architecture for the service capability exposure illustrated in FIG. 9 illustrates that the 3GPP network securely exposes services and capabilities thereof provided by the 3GPP network interface to an external third party service provider application.

A service capability exposure function (SCEF) is a core entity within the 3GPP architecture for the service capability exposure that provides a means for securely exposing the services and capabilities provided by 3GPP network interface. In other words, the SCEF is a key entity for providing service functions belonging to a trust domain operated by a mobile communication provider. The SCEF provides API interfaces to third party service providers and provides 3GPP service functions to third party service providers through connections with various entities of 3GPP. The SCEF may be provided by the SCS.

When a Tsp function may be exposed through the application program interface (API), the MTC-IWF may be co-located with the SCEF. A protocol (e.g., DIAMETER, RESTful APIs, XML over HTTP, etc.) is selected to specify a new 3GPP interface depending on multiple factors and herein, the multiple factors include the facilitation of exposure of requested information, and need of a specific interface, but are not limited thereto.

The SCEF is an entity belonged to a Trusted Domain, and may be managed by a Cellular operator or a third party service provider in trusted relation. Particularly, the SCEF is a node for service architecture exposing progressed as a work item such as MONTE, AESE, and the like of 3GPP Release 13, and in connection with 3GPP entities to provide a service as shown in FIG. 8, provides functions in relation to monitoring and charging to an external third party. In addition, the SCEF may manage the function such as configuration of communication pattern of the third party service provider into the EPS intermediately.

Attach Procedure

A UE is required to be registered in a network in order to be provided with a service that requires registration. Such a registration may be referred to as a network access. Hereinafter, an initial access procedure in E-UTRAN will be described.

FIG. 10 is a flowchart illustrating an attach procedure according to an embodiment of the present invention.

1-2. First, a UE camping on an E-UTRAN cell may start an attach procedure with a new MME by transmitting an Attach Request message to an eNB.

The Attach Request message includes an International Mobile Subscriber Identity (IMSI) of the UE, a PDN type requested by the UE, and the like. Here, the PDN type indicates an IP version (i.e., IPv4, IPv4v6 or IPv6) requested by the UE.

The Attach Request message is forwarded by being included in an RRC Connection Setup Complete message in an RRC connection, and forwarded by being included in an Initial UE message in an S1 signaling connection.

In order to request PDN connectivity, the UE may also transmit an Attach Request message together with a PDN Connectivity Request message.

3. In the case that the UE distinguishes the UE itself using a GUTI and an MME is changed to detach later, a new MME may determine a type of an old node (e.g., MME or SGSN) and may use the GUTI received from the UE in order to derive the old MME/SGSN address. In addition, the new MME may transmit an Identification Request (including old GUTI and complete Attach Request message) to the old MME/SGSN in order to request an IMSI. The old MME may identify the Attach Request message by a NAS MAC first, and then may perform an Identification Response (including IMSI and MM context) in response to the Identification Request.

4. In the case that the UE is not known to all of the old MME/SGSN and the new MME, the new MME may transmit an Identification Request to the UE in order to request the IMSI. The UE may respond to the corresponding identification request in response to the Identification Response including the IMSI.

5a. In the case that a UE context is not existed in a network, the Attach Procedure is not integrity protected, or identification of integrity is failed, the Authentication and NAS security setup for activating the integrity protection and the NAS ciphering may be essentially performed. In the case that the NAS security algorithm is changed, the NAS security setup may be performed in this procedure.

5b. The new MME may retrieve/search IMEISV (ME Identity) from the UE. At this time, the IMEISV (ME Identity) may be coded and transmitted except the case that the UE performs an emergency access or is unable to authenticate.

6. In the case that the UE configures a Ciphered Options Transfer Flag in the Attach Request message, the new MME may retrieve/search Ciphered Options (e.g., Protocol Configuration Options (PCO) and/or APN (name of PDN)) from the UE.

7. In the case that a bearer context activated in the new MME for a specific UE is existed, the new MME deletes the bearer context by transmitting LBI (Delete Session Request) message to a GW. The GWs respond with a Delete Session Response (Cause) message.

8. After the Detach, in the case that the MME is changed, there is no valid UE for the MME, the UE provides an IMSI, the UE provides an invalid old GUTI for the MME, or a GUTI of the UE context is different in the scenario in which a PLMN-ID of TAI by an eNB is shared (e.g., GWCN) in a part of networks, the MME may transmit an Update Location request message to an HSS.

9. The HSS transmits a Cancel Location (including IMSI and Cancellation Type) to the old MME. The old MME responds through Cancel Location Ack (including IMSI), and removes Mobility Management (MM) context and the bearer context.

10. In the case that there is an activated bearer context in the old MME/SGSN with respect to a specific UE, the old MME/SGSN may remove the corresponding bearer context by transmitting Delete Session Request (LBI) to the GW. The GW may transmit the Delete Session Response (Cause) to the old MME/SGSN.

11. In response to the Update Location Request message, the HSS may transmit an Update Location Ack message (including IMSI and Subscription data) to the new MME.

12. In the case of urgent Attach, the MME may apply parameters from MME urgent configuration data for an urgent bearer establishment performed in this step, and may ignore IMSI-related subscriber information stored potentially.

13. A serving GW generates a new item in an EPS Bearer table, and sends a Create Session Request message to a PDN GW (or P-GW) indicated by the PDN GW address which is received from the previous step.

14. In the case that a dynamic PCC is performed and handover indication is not existed, the PDN GW performs an IP-CAN Session Establishment process defined in TS 23.203 [6], and by doing this, the PDN GW obtains default PCC rule for the UE.

Steps 12 to 16 described above may be omitted in the case that EPS Session Management (ESM) container is not included in the Attach Request.

15. The P-GW generates a new item in the EPS bearer context table, and generates a charge ID for the default bearer. The new item allows a user plane PDU path between the S-GW and a packet data network by the P-GW and a charge start. In addition, the P-GW transmits a Create Session Response message to the Serving GW.

16. The Serving GW transmits the Create Session Response message to the new MME.

17. The new MME may transmit downlink NAS transport together with an initial context setup request or Attach Accept to the eNB.

18. The eNB transmits an RRC Connection Reconfiguration message including an EPS Radio Bearer Identity to the UE, and at this time, an Attach Accept message is also transmitted to the UE.

19. The UE transmits an RRC Connection Reconfiguration Complete message to the eNB.

20. The eNB transmits an Initial Context Response message to the new MME. The Initial Context Response message includes an address of the eNB used for DL traffic of S1-U reference point.

21. The UE sends a Direct Transfer message including an Attach Complete message (including EPS Bearer Identity, NAS sequence number and NAS-MAC) to the eNB.

22. The eNB forwards the Attach Complete message to the new MME.

23. In the case that both of the Initial Context Response of step 20 and the Attach Complete message of step 22 are received, the new MME transmits a Modify Bearer Request message to the Serving GW.

23a. In the case that a handover indication is included in step 23, the Serving GW sends the Modify Bearer Request message to the PDN GW.

23b. The PDN GW may respond to the Modify Bearer Request message by transmitting a Modify Bearer Response to the Serving GW.

24. The Serving GW may transmit the Modify Bearer Response message (including EPS Bearer Identity) to the new MME. Next, the Serving GW may send buffer DL packets of the Serving GW.

25. The MME sends a Notify Request message including APN and PDN GW identity to the HSS for non-3GPP attach. The corresponding message includes information identifying a PLMN in which the PDN GW is located.

26. The HSS stores the APN and PDN GW identity pair and transmits the Notify Response to the MME.

Efficient Small Data Transmission for Narrow Band Internet of Things (IoT)

Cellular Internet of Things (CIoT) defines a new radio access proper to IoT service, and two types of CIoT have been discussed in 3GPP Release-13 currently. One is a solution that evolves GERAN in CIoT form and another is a new radio access network form proper to Narrow Band (NB) Radio Access Technology (RAT) (e.g., NB-IOT), which is referred to as Clean Slate.

In 3GPP, architecture has been discussed for a new core network for an efficient small data transmission for supporting Narrow Band IOT.

FIG. 11 is a diagram illustrating an End to End small data flow in a wireless communication system to which the present invention may be applied.

As illustrated in FIG. 11, transmission/reception of non-IP data may be performed in a point-to-point tunnel scheme between an Application Server (AS) and a CIoT Serving Gateway Node (C-SGN). The present disclosure describes an execution option that the C-SGN supports a CIoT UE and S-GW/P-GW and an MME are configured by being physically co-located, which is added in Release-13. The C-SGN is a serving gateway node, and may correspond to a node in which major functions of an MME and major functions of an S-GW are combined for efficient support of CIoT. In the present disclosure, the C-SGN may be interpreted as both of a C-SGN defined as a new node and a node in which the CIoT function is added to the combination of the existing MME and S-GW.

Alternatively, SCEF framework may be used for transmitting and receiving a Non-IP packet. In other words, transmission/reception of the Non-IP data may be performed between AS/SCS and the C-SGN via the SCEF.

Further, transmission/reception of the Non-IP data may be performed between the C-SGN and a UE through S1-MME reference point. That is, small data (e.g., Non-IP data) encoded in NAS layer may be transmitted and received between the UE and the C-SGN.

The C-SGN is a new logical entity, and may be implemented for supporting essential functions only that are required for CIoT application cases as below.

Some procedures required in a Mobility Management (MM) procedure;
Efficient small data procedure;
Security procedure required for efficient small data
SMS on PS domain using non-combined GPRS attach procedure, when Short Message Service (SMS) support is required;
Paging optimization for coverage enhancement;
Termination of SGi interface for non-roaming cases;
S8 interface support for roaming cases
Attach procedure support only for SMS (i.e., attach for SMS transmission/reception only without a PDN connection for IP (or non-IP) data);
Tunneling support on SGi for non-IP data.

In addition, the following solutions may be proposed with respect to a method for improving core network for transmitting infrequent small data (e.g., Non-IP data) which is data of CIoT device (or NB-IoT device) using SCEF.

1) Solution 2: Solution 2 may correspond to infrequent small data transmission using the NAS security which is established in advance. Solution 2 may be regarded as a basis of normative work for supporting the infrequent small data transmission (for IP data, non-IP data and SMS). Such solution 2 may be mandatory application to a UE and a network.

2) Solution 18: Solution 18 may correspond to a method of transmitting the infrequent small data through user plane by using AS information stored in RAN. Solution 18 may be regarded as a basis of normative work for supporting the infrequent small data transmission (for IP data, non-IP data and SMS). Such solution 2 may selective application to a UE and a network. Solution 18 may borrow/introduce other solution (e.g., solution 10, solution 15, etc.) for providing non-IP support.

That is, in summarizing the contents of the solutions above, the Control Plane (CP) solution (i.e., solution 2) for data transmission in a NAS PDU through a Signaling Radio Bearer (SRB) of a UE and a network is needed to be support/applied mandatorily. On the other hand, solution 18 that data transmission is required but AS parameters cache a DRB (S1-U) in an eNB when a UE is switched from a connected state to an idle state may be optionally supported or applied.

In the case that a UE and a network use both of the CP solution and the UP solution, packet data may be transmitted and received with being encapsulated and included in a NAS PDU through an SRB when the CP solution is used, and packet data may be transmitted and received as a DRB through a DRB setup when the UP solution is used. However, up to now, it has not been particularly determined through which path a UE transmits packet data in a certain situation. In addition, in the case that a UE setup a DRB but a network wants to transmit data in control plane, an efficient procedure for solving it is also not particularly defined yet.

Accordingly, the present disclosure proposes i) a method for determining whether a UE and a network transmit/receive data in a control plane path or a user plane path (through a DRB) (FIG. 12) and ii) a method for a UE to establish a connection with a network to transmit data through a user plane path (through a DRB), and then, for the network to switch/change the network path to control plane path again (FIG. 13 to FIG. 15).

Meanwhile, in the present disclosure, the CP solution may be referred to as 'CP mode', 'CP-only mode' or 'solution 2' and the UP solution may be referred to as 'UP mode' or 'solution 18'.

A method for determining whether a UE and a network transmit/receive data in a control plane path or a user plane path (through a DRB)

FIG. 12 is a flowchart illustrating an attach procedure for a CIoT UE according to an embodiment of the present invention. Particularly, this flowchart particularly exemplifies a method for a UE and a network to determine a certain plane path to transmit/receive data.

1. First, a UE may transmit a fact on whether the UE supports the UP solution (UP capability) to a C-SGN (or MME/network) through Attach Request/TAU Request procedure (or Attach Request/Tau Request message). And/or through such Attach Request/TAU Request procedure (or Attach Request/Tau Request message), the UE may transmit a fact on whether the UP supports the CP solution (CP capability) to the C-SGN (or MME/network) through Attach Request/TAU Request procedure (or Attach Request/Tau Request message). Further, through such Attach Request/TAU Request procedure (or Attach Request/Tau Request message), the UE may transmit a type of data to transmit (e.g., whether it is an IP type, a Non-IP type or an SMS only type) to the C-SGN (or MME/network). In this flowchart, a description of the Attach Request procedure may be identically/similarly applied to the description described in relation to steps 1 and 2 of FIG. 10.

2. Next, the UE and the C-SGN (or MME/network) perform the Attach procedure. As the Attach procedure of the flowchart, Steps 3 to 11 of FIG. 10 may be performed, and the new MME and the serving GW in FIG. 10 may correspond to the (new) C-SGN, and the old MME may correspond to (old) C-SGN. In addition, in the flowchart, some steps/operations not in accordance with the CIoT use in steps 3 to 11 of FIG. 10 may be omitted or new steps/operations proper to the CIoT use may be added.

In this procedure, the C-SGN (or MME/network) may transmit an update location request message for registration of a UE to an HSS. Here, the transmission of the location request message for registration of the UE may be interpreted as, when valid subscription information/context for the UE is not existed, the MME transmits the location request message to the HSS in order to obtain valid subscription information/context for the UE.

In response to the location request message, the HSS transmits an update location response (update location ack)

message to the C-SGN (or MME/network), and through this, the C-SGN (or MME/network) may receive subscription information of the UE from the HSS. The subscription information may include traffic pattern information of the UE, and the traffic pattern information may include various types of information such as mobility of the UE (stationary or mobile UE) and busyness of traffic used by the UE (on the basis of per day, per hour, per minute, etc.) and/or average data size.

3. The C-SGN (or MME/network) may determine whether to perform a PDN connection setup and a DRB setup based on a data type and/or UP capability of the UE as below. In other words, the C-SGN (or MME/network) may determine whether to apply the UP mode or the CP mode (or CP-only mode) based on a data type and/or UP capability of the UE as below.

1) The Case that a Data Type is SMS

The C-SGN (or MME/network) may transmit an Attach Accept message to the UE without PDN connection setup (e.g., IP allocation, etc.) and DRB setup procedure. In this case, the procedure such as an initial context setup may be omitted. That is, the C-SGN (or MME/network) may transmit the Attach Accept message to the UE according to step 5a or 6a.

2-1) the Case that a Data Type is Non-Ip

As an embodiment of the case that a data type is Non-ip, it may be changed whether the C-SGN (or MME/network) applies a certain mode depending on non-ip data transmission policy (or may be referred to as a local policy). In the case of transmitting non-ip data using the SCEF function, the C-SGN (or MME/network) may omit the PDN connection setup and the DRB setup regardless of the UP capability of the UE. In addition, in this case, the procedure such as the initial context setup may also be omitted. That is, the C-SGN (or MME/network) may transmit the Attach Accept message to the UE according to step 5a or 6a.

In other words, the C-SGN (or MME/network) may select/determine the CP mode (always) as a data transmission mode in the case of intended to transmit non-ip data using the SCEF function according to the non-ip data transmission policy (or local policy), and may transmit CP-only indication/indicator for indicating a selection of the CP mode (or for indicating an application of the CP mode) to the UE. That is, in the case that an associated PDN connection corresponds to only a connection for the CP mode, the C-SGN (or MME/network) may include the CP-only indication/indicator, and may transmit the CP-only indication/indicator to an eNB.

For this, the C-SGN (or MME/network) may transmit the CP-only indication/indicator with being included in the Attach Accept message to the UE via the eNB. The UE that receives the CP-only indicator (or the UE indicated with the CP mode) may transmit/receive data through an SRB by applying the CP mode.

2-2) The Case that a Data Type is Non-Ip

Another embodiment for the case that a data type is Non-ip, in the case that the C-SGN (or MME/network) is intended to non-ip data through SGi interface of a network, an operation (step 4) according to a PDN connection setup network policy (however, in this case, an ip allocation of a P-GW may be required according to a certain solution which is intended to apply).

At this time, the C-SGN (or MME/network) may determine whether to transmit Non-ip packet in an SRB or a DRB (i.e., whether to apply the CP solution or the UP solution). More particularly, the C-SGN (or MME/network) may determine whether to transmit SRB/DRB based on the UP capability and the subscription information of the UE.

For example, in the case that the UE is available to apply/perform the UP solution (i.e., has the UP capability), a network is also available to support the UP solution, and it is determined that the UP solution is proper for saving power consumption of the UE, the C-SGN (or MME/network) may instruct/order a DRB setup (corresponds to step 5b) to the UE (through the Attach Accept message). Here, the case that it is determined that the UP solution is proper for saving power consumption of the UE, may be correspond to the case that data transmission of a static UE not having mobility, transmission of relatively big sized data, the case that frequent data transmission is required, and the like, for example. Furthermore, the C-SGN (or MME/network) may perform an initial context setup procedure for a DRB (corresponds to step 6b). The initial context setup procedure (corresponds to steps 18 to 26 of FIG. 10) in the default bearer setup performed in the existing Attach procedure may be identically applied.

At this time, the eNB may start/perform an RRC connection suspension in the case that data transmission/reception of the UE is not detected as described in Solution 18 above. In this case, the UE may receive Resume id from a serving eNB with being switched from a connected state to an idle state. Here, the Resume id is an identifier generated based on an eNB ID, and used for addressing the associated information stored in the eNB. As a result, the UE may store the Resume id received from the eNB while being switched to the idle state.

Later, when the UE requires a mobile originated data transmission or paging reception, the UE may transmit an RRC connection resume request message including the Resume id instead of an RRC connection request message such that a DRB such as the AS security setup using the AS parameter stored in the eNB in the existing RRC connection setup procedure.

2-3) the Case that a Data Type is IP

In the case that a data type is IP, the C-SGN (or MME/network) may allocate an IP address to the UE through the PDN connection setup procedure (step 4), and may determine whether an application of the UP solution is efficient presently like the embodiment of 2-2). In the case that it is determined that an application of the UP solution is efficient, the C-SGN (or MME/network) may perform step 5b and/or 6b, and in the case that it is determined that an application of the UP solution is inefficient, the C-SGN (or MME/network) may perform step 5a and/or 5a, not instructing the DRB setup.

At this time, the Attach Accept message transmitted to the UE may explicitly include information (e.g., CP-only indicator) indicating that the C-SGN (or MME/network) selects the UP solution (i.e., data transmission/reception through a DRB) or the CP solution (i.e., data transmission/reception through an SRB/CP-only mode). Alternatively, in the case that the UE is setup with a default DRB and receives a resume id from the eNB when the UE is attached, the C-SGN (or MME/network) may determine to select the UP solution implicitly.

In the case that the UE enters an idle state/mode after completing/succeeding the Attach procedure, and then performs a transmission (Mobile originated call) or a reception (Mobile terminated call), the UE performs a data transmission according to the mode/solution which is determined/selected in the Attach procedure.

That is, i) in the case that the UP mode/solution (resume id reception when a DRB setup is performed) is selected, the UE requests an RRC connection with an RRC connection resume request, and ii) in the case that the UP mode/solution is not selected (i.e., in the case that the CP mode/CP-only mode is selected), the UE performs only the procedure for SRB setup and transmits data in the form of an RRC message encapsulation.

And/or the UE may select either one of the UP solution/mode or the CP solution/mode directly, and may perform the service request procedure for the selected solution/mode. More particularly, when the UE performs the service request procedure, while transmitting data in a NAS PDU, the UE may transmit a service request message of different message formats or may transmit a service request message including different cause values depending on whether it is a service request that an initial context setup is unnecessary (i.e., whether it is a service request for the CP solution/mode) and whether it is a service request of the existing scheme that requires the AS security setup (i.e., whether it is a service request for the UP solution/mode).

For the former case, for example, the UE may transmit a CP service request message in order to start a service request for the CP solution/mode, and may transmit a service request message in order to start a service request for the UP solution/mode. The CP service request message and the service request message may be distinguished/identified by the C-SGN (or MME/network) based on the message format (more particularly, contents, length, type, information, etc. included in the message).

The C-SGN (or MME/network) may determine/select a data path for configuring to the UE by determining that a service request of the UE is a certain solution/mode based on the format or cause value of the received message as such.

Alternatively, different from the embodiment described above, the UE may transmit/use a service request message of the same format, and the C-SGN (or MME/network) may decide/determine the data path configured for the UE based on the CP/UP mode context information of the UE.

FIGS. 13 to 15 are diagrams illustrating a method for switching from the UP mode to the CP mode according to an embodiment of the present invention.

After a C-SGN (or MME/network) or a UE selects the UP solution/mode through the Attach procedure/TAU procedure, the C-SGN (or MME/network) may instruct the UE to fall back to the CP solution/mode under a specific condition.

Here, for example, the specific condition may correspond to the case that the UE gets out of an eNB from which a resume id is received owing to frequent movement and requests full RRC connection setup frequently to the C-SGN (or MME/network). That is, in order to reduce overhead owing to the frequent full RRC connection setup of the UE, the C-SGN (or MME/network) may instruct/order the UE to fall back to the CP solution/mode. In addition, the specific condition may correspond to the case that subscription information of the UE is changed and the C-SGN (or MME/network) identifies that a traffic pattern of the UE is changed or receives a communication pattern of the UE from an Application Server through an SCEF.

That is, according to the case that a C-SGN, which is a stand-alone node in which an MME and an S-GW are existed in the same node (corresponds to the embodiment of FIGS. 13(a) and 14) and the case that S11 interface is existed between the S-GW and the MME (i.e., the case that the S-GW and the MME are separately existed) (corresponds to the embodiment of FIGS. 13(b) and 15), the procedure of falling back to the CP solution/mode may be different, and this will be described in detail below with reference to respective drawings.

FIGS. 13(a) and 14 are diagrams illustrating a fallback procedure to the CP solution/mode by a C-SGN.

In this embodiment, a C-SGN (or MME/network) transmits a Release DRB request to an eNB and a UE in the case that the C-SGN (or MME/network) wants to change a data delivery mode from the UP mode to the CP mode. This may be performed in connection with other procedure such as the TAU procedure, or may be performed in the paging procedure.

At this time, different from the existing bearer deactivation, a bearer deactivation from a P-GW is not required. That is, according to the transmission mode change, the bearer for the UE between the C-SGN and the P-GW is still valid. However, as shown in FIG. 13(a), it is just become different whether the bearer path is configured as a control plane path of S1-MME+SRB or a user plane path of S1-U+DRB.

Hereinafter, with reference to FIG. 14, a fallback procedure to the CP solution/mode of the C-SGN (or MME/network) will be described in more detail.

1. When the C-SGN (or MME/network) decides/determines to switch the UE to the CP mode, the C-SGN (or MME/network) transmits a release DRB request message to an eNB (or eNB/C-BS). The corresponding message may include a NAS message indicating/representing a deactivate DRB (mode change from UP to CP).

2. The eNB deletes all AS parameters stored for the UE when the eNB receives the release DRB request message. In addition, the eNB (or eNB/C-BS) transmits the received NAS message (deactivate DRB) to the UE.

3. The access stratum (AS) of the UE releases/deletes the DRB related Context (including resume id) which is stored, and transmits a deactivate DRB request message to NAS layer. As a result, the data transmission mode of the UE (or the NAS of the UE) may be switched from the UP mode to the CP mode. The UE may transmit a NAS message indicating that the switching to the CP mode is completed and/or a DRB is released (or deactivated) to eNB (or eNB/C-BS).

The service request procedure of the UE progressed later is performed in the CP mode, and a packet data is transmitted to a network by being included in a NAS PDU.

4. The eNB (or eNB/C-BS) indicates that the DRB release is completed and the UE is switched from the UP mode to the CP mode to the C-SGN (or MME/network). At this time, the eNB (or eNB/C-BS) may transmit a DRB release Accept message indicating switching completion to the CP mode to the C-SGN (or MME/network). Accordingly, the C-SGN (or MME/network) may update the mode context information of the corresponding UE (to the CP mode).

FIGS. 13(b) and 15 are diagrams illustrating a fallback procedure to the CP solution/mode by an MME/S-GW.

Different from the embodiment of FIGS. 13(a) and 14, in the case that an MME and an S-GW are existed individually, not integrated into a single node, the fallback procedure to the CP mode may be changed. More particularly, in the case of intended to change a data transmission mode of a UE to the CP mode, as shown in FIG. 13(b), the MME is needed to change the bearer path from the user plane path of S1-U+DRB to the control plane path of S1-MME+SRB.

Hereinafter, referring to FIG. 15, the fallback procedure to the CP solution/mode of the MME will be described. Meanwhile, in this flowchart, the MME individually existed by being separated from the S-GW may be referred to as 'C-SGN'. Accordingly, the description of the MME may also be understood as the description of the C-SGN.

1. The MME (or C-SGN) transmits a Switch bearer request message indicating to change S1-U path to S11 to the S-GW that determines to change a mode of the UE to the CP mode. In this case, the MME may indicate to change from the UP mode to the CP mode through the Switch bearer request message to the S-GW explicitly.

2. The S-GW releases the S1-U path, and reserve/generate S11 path such that packet data of the UE is transmitted using the S11 path. In addition, when the reservation/generation of the S11 path is completed, the MME transmits a Switch bearer complete message.

3. In the case that the MME (or C-SGN) decides/determines to switch a mode of the UE to the CP mode, the MME (or C-SGN) transmits a release DRB request message to an eNB (or eNB/C-BS). The corresponding message may include a NAS message indicating/representing a deactivate DRB (mode change from UP to CP).

4. When the eNB (or eNB/C-BS) receives the Release DRB request message, the eNB (or eNB/C-BS) deletes all AS parameters stored for the UE. In addition, the eNB (or eNB/C-BS) transmits the received NAS message (deactivate DRB) to the UE.

5. The AS of the UE releases/deletes the DRB related Context (including resume id) which is stored, and transmits a deactivate DRB request message to NAS layer. As a result, the data transmission mode of the UE (or the NAS of the UE) may be switched from the UP mode to the CP mode. The UE may transmit a NAS message indicating that the switching to the CP mode is completed and/or a DRB is released (or deactivated) to eNB (or eNB/C-BS).

The service request procedure of the UE progressed later is performed in the CP mode, and a packet data is transmitted to a network by being included in a NAS PDU.

6. The eNB (or eNB/C-BS) notifies that the DRB release is completed and the UE is switched from the UP mode to the CP mode to the MME (or C-SGN). At this time, the eNB (or eNB/C-BS) may transmit a DRB release Accept message indicating switching completion to the CP mode to the MME (or C-SGN). Accordingly, the MME (or C-SGN) may update the mode context information of the corresponding UE (to the CP mode).

FIG. 16 is a flowchart for a data transmission mode switching method by an MME according to an embodiment of the present invention. In relation to this flowchart, the embodiments described above may be identically/similarly applied, and the repeated description will be omitted.

First, an MME may perform the User Plane (UP) mode, which is a data transmission mode for transmitting/receiving data between a UE and an eNB in the UP plane through a Data Radio Bearer (DRB) (step, S1610).

Next, the MME may detect a change condition from the UP mode to the CP mode (step, S1620). Here, the CP mode may correspond to a data transmission mode for transmitting/receiving data between the UE and the eNB in the control plane through a Signaling Radio Bearer (SRB). The change condition may be configured based on a radio resource control (RRC) connection setup request frequency of the UE, whether to change subscription information of the UE, whether to change a traffic pattern of the UE and/or whether to receive communication pattern information of the UE.

Next, the MME may transmit a switch bearer request message for changing a bearer to a Serving-Gateway (S-GW) (step, S1630), and in response to the switch bearer request message, the MME may receive a switch bearer complete message from the S-GW (step, S1640).

Next, the MME may transmit a DRB release request message to the LIE through the eNB (step, S1650). The DRB release request message may include a Non-Access Stratum (NAS) message indicating a release of a DRB or the data change mode switching from the UP mode to the CP mode.

Next, in response to the DRB release request message, the MME receives a DRB release accept message (step, S1660), and according to the DRB release accept message, the MME may update the data transmission mode to the CP mode (step, S1670).

When the data transmission mode is switched from the UP mode to the CP mode, the path through which data is transmitted from the UE may be changed from the user plane path via the eNB and the S-GW to the control plane path via the eNB, the MME and the S-GW.

FIG. 17 is a flowchart of a method for indicating a data transmission mode of an MME according to an embodiment of the present invention. In relation to this flowchart, the embodiments described above may be identically/similarly applied, and the repeated description will be omitted.

First, an MME may receive an Attach request message from a UE (step, S1710). At this time, the Attach request message may include information of UP capability in relation to whether the UE supports the UP mode and/or PDN type (or data type).

Next, the MME transmits an update location request message to an HSS (step, S1720), and may receive an update location response message including subscription information of the UE in response to the update location request message (step, S1730).

Next, the MME may determine whether to apply the CP mode as the data transmission mode with respect to a PDN connection based on a local policy (or non-ip data transmission policy) (step, S1740). Here, the data transmission mode is a concept that includes the UP mode and the CP mode. The UP mode may be a data transmission mode of transmitting/receiving data on the user plane through a Data Radio Bearer (DRB) between a UE and an eNB. The CP mode may be a data transmission mode in which a NAS PDU carrying data is generated, and the generated NAS PDU is included in an RRC container and transmitted/received between the UE and the eNB, Lastly, the MME may transmit an Attach accept message including information of indicating to apply the CP mode in response to the Attach request message (step, S1750).

Although it is not shown in the flowchart, the MME may receive a service request message for initiating a UE-triggered service request procedure from the UE to which the CP mode is applied based on the Attach accept message. At this time, the service request message for the CP mode may be defined as a different message format from the service request message for the UP mode.

In addition, in the case that the Attach request message include PDN type information indicating non-ip type and a PDN connection is established through Service Capability Exposure Function (SCEF), the MME may be configured to include the information indicating to apply the CP mode in the Attach accept message always, and to transmit the information.

Furthermore, in the case that the CP mode is applied, the MME may be configured not to perform an initial context setup procedure.

Overview of Devices to which the Present Invention can be Applied

FIG. 18 illustrates a block diagram of a communication device according to one embodiment of the present invention.

With reference to FIG. 18, a wireless communication system comprises a network node 1810 and a plurality of UEs 1820.

A network node 1810 comprises a processor 1811, memory 1812, and communication module 1813. The processor 1811 implements proposed functions, processes and/or methods proposed through FIG. 1 to FIG. 17. The processor 1811 can implement layers of wired/wireless interface protocol. The memory 1812, being connected to the processor 1811, stores various types of information for driving the processor 1811. The communication module 1813, being connected to the processor 1811, transmits and/or receives wired/wireless signals. Examples of the network node 1810 include an eNB, MME, HSS, SGW, PGW, application server and so on. In particular, in case the network node 1810 is an eNB, the communication module 1813 can include a Radio Frequency (RF) unit for transmitting/receiving a radio signal.

The UE 1820 comprises a processor 1821, memory 1822, and communication module (or RF unit) 1823. The processor 1821 implements proposed functions, processes and/or methods proposed through FIG. 1 to FIG. 17. The processor 1821 can implement layers of wired/wireless interface protocol. The memory 1822, being connected to the processor 1821, stores various types of information for driving the processor 1821. The communication module 1823, being connected to the processor 1821, transmits and/or receives wired/wireless signals.

The memory 1812, 1822 can be installed inside or outside the processor 1811, 1821 and can be connected to the processor 1811, 1821 through various well-known means. Also, the network node 1810 (in the case of an eNB) and/or the UE 1820 can have a single antenna or multiple antennas.

FIG. 19 illustrates a block diagram of a wireless communication apparatus according to an embodiment of the present invention.

Particularly, in FIG. 19, the UE described above FIG. 18 will be exemplified in more detail.

Referring to FIG. 19, the UE includes a processor (or digital signal processor) 1910, RF module (RF unit) 1935, power management module 1905, antenna 1940, battery 1955, display 1915, keypad 1920, memory 1930, Subscriber Identification Module (SIM) card 1925 (which may be optional), speaker 1945 and microphone 1950. The UE may include a single antenna or multiple antennas.

The processor 1910 may be configured to implement the functions, procedures and/or methods proposed by the present invention as described in FIG. 1-18. Layers of a wireless interface protocol may be implemented by the processor 1910.

The memory 1930 is connected to the processor 1910 and stores information related to operations of the processor 1910. The memory 1930 may be located inside or outside the processor 1910 and may be connected to the processors 1910 through various well-known means.

A user enters instructional information, such as a telephone number, for example, by pushing the buttons of a keypad 1920 or by voice activation using the microphone 1950. The microprocessor 1910 receives and processes the instructional information to perform the appropriate function, such as to dial the telephone number. Operational data may be retrieved from the SIM card 1925 or the memory module 1930 to perform the function. Furthermore, the processor 1910 may display the instructional and operational information on the display 1915 for the user's reference and convenience.

The RF module 1935 is connected to the processor 1910, transmits and/or receives an RF signal. The processor 1910 issues instructional information to the RF module 1935, to initiate communication, for example, transmits radio signals comprising voice communication data. The RF module 1935 comprises a receiver and a transmitter to receive and transmit radio signals. An antenna 1940 facilitates the transmission and reception of radio signals. Upon receiving radio signals, the RF module 1935 may forward and convert the signals to baseband frequency for processing by the processor 1910. The processed signals would be transformed into audible or readable information outputted via the speaker 1945.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

MODE FOR INVENTION

Various forms for implementing the present invention have been described in the best mode for implementing the present invention.

INDUSTRIAL APPLICABILITY

The present invention is applied to a 3GPP LTE/LTE-A system is primarily described, but can be applied to various wireless communication systems in addition to the 3GPP LTE/LTE-A system.

What is claimed is:

1. A method for switching a data transmission mode performed by a Mobility Management Entity (MME) in a wireless communication system, comprising:

performing a User Plane (UP) mode, which is a data transmission mode of transmitting and receiving data, through a Data Radio Bearer (DRB), between a user equipment (UE) and a base station (BS) in a user plane;

detecting a change condition from the UP mode to a Control Plane (CP) mode, which is a data transmission mode of transmitting and receiving data, through a Signaling Radio Bearer (SRB), between the UE and the BS in a control plane, wherein the change condition is configured based on a radio resource control (RRC) connection setup request frequency of the UE, whether to change subscription information of the UE, whether to change a traffic pattern of the UE and/or whether to receive communication pattern information of the UE;

transmitting a switch bearer request message for changing a bearer to a Serving-Gateway (S-GW);

receiving a switch bearer complete message from the S-GW in response to the switch bearer request message;

transmitting a DRB release request message to the UE through the BS, wherein the DRB release request message includes a Non-Access Stratum (NAS) message indicating a release of the DRB or the data transmission mode switching from the UP mode to the CP mode;

receiving a DRB release accept message in response to the DRB release request message; and updating the data transmission mode to the CP mode according to the DRB release accept message.

2. The method of claim 1, wherein, when the BS receives the DRB release request message, the BS deletes Access Stratum parameters associated with the UE, and forwards the received NAS message to the UE.

3. The method of claim 2, wherein, when the UE receives the NAS message, the UE switches the UP mode to the CP mode.

4. The method of claim 3, further comprising receiving a service request message for initiating a UE-triggered service request procedure from the UE switched to the CP mode, wherein the service request message for the CP mode is defined as a different message format from the service request message for the UP mode.

5. The method of claim 4, further comprising receiving the data through a NAS packet data unit (PDU) from the UE switched to the CP mode, when the UE-triggered service request procedure is completed.

6. The method of claim 1, wherein, when the data transmission mode is switched from the UP mode to the CP mode, a path through which data is transmitted from the UE is changed from the user plane path via the BS and the S-GW to the control plane path via the BS, the MME and the S-GW.

7. A Mobility Management Entity (MME) for switching a data transmission mode in a wireless communication system, comprising:

a communication module including a transceiver configured to transmit and receive a radio signal;

a processor configured to control the communication module;

wherein the processor is further configured to:

perform a User Plane (UP) mode, which is a data transmission mode of transmitting and receiving data, through a Data Radio Bearer (DRB), between a user equipment (UE) and a base station (BS) in a user plane;

detect a change condition from the UP mode to a Control Plane (CP) mode, which is a data transmission mode of transmitting and receiving data, through a Signaling Radio Bearer (SRB), between the UE and the BS in a control plane, wherein the change condition is configured based on a radio resource control (RRC) connection setup request frequency of the UE, whether to change subscription information of the UE, whether to change a traffic pattern of the UE and/or whether to receive communication pattern information of the UE;

transmit a switch bearer request message for changing a bearer to a Serving-Gateway (S-GW);

receive a switch bearer complete message from the S-GW in response to the switch bearer request message;

transmit a DRB release request message to the UE through the BS, wherein the DRB release request message includes a Non-Access Stratum (NAS) message indicating a release of the DRB or the data transmission mode switching from the UP mode to the CP mode;

receive a DRB release accept message in response to the DRB release request message; and update the data transmission mode to the CP mode according to the DRB release accept message.

8. The MME of claim 1, wherein, when the BS receives the DRB release request message, the BS deletes Access Stratum parameters associated with the UE, and forwards the received NAS message to the UE.

9. The MME of claim 8, wherein, when the UE receives the NAS message, the UE switches the UP mode to the CP mode.

10. The MME of claim 9, wherein the processor is further configured to receive a service request message for initiating a UE-triggered service request procedure from the UE switched to the CP mode, and wherein the service request message for the CP mode is defined as a different message format from the service request message for the UP mode.

11. The MME of claim 10, wherein the processor is further configured to receive the data through a NAS packet data unit (PDU) from the UE switched to the CP mode, when the UE-triggered service request procedure is completed.

12. The MME of claim 7, wherein, when the data transmission mode is switched from the UP mode to the CP mode, a path through which data is transmitted from the UE is changed from the user plane path via the BS and the S-GW to the control plane path via the BS, the MME and the S-GW.

* * * * *